G. A. SLOUGH.
STEERING GEAR LOCK.
APPLICATION FILED MAY 8, 1917.
1,288,715.
Patented Dec. 24, 1918.
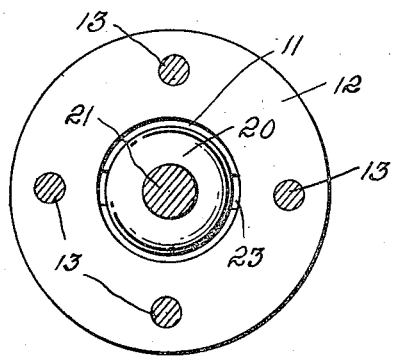
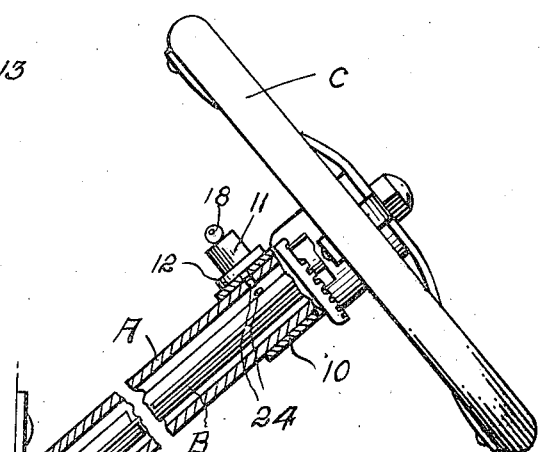
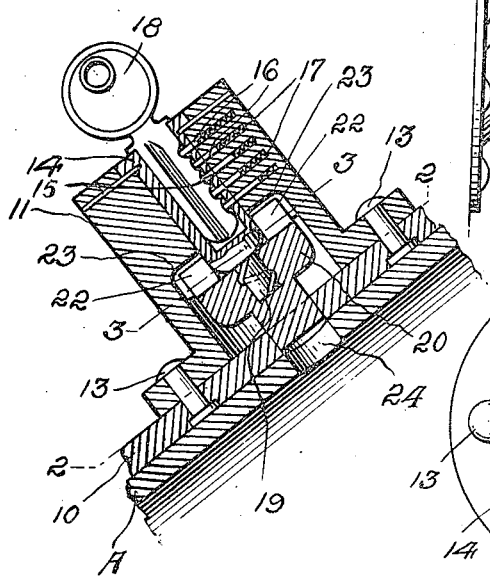
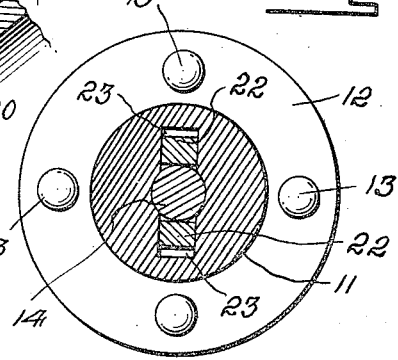
Inventor
George A. Slough.
By Lancaster and Alwine
His Attorneys

UNITED STATES PATENT OFFICE.

GEORGE A. SLOUGH, OF UNION CITY, INDIANA.

STEERING-GEAR LOCK.

1,288,715.    Specification of Letters Patent.    Patented Dec. 24, 1918.

Application filed May 8, 1917. Serial No. 167,233.

*To all whom it may concern:*

Be it known that I, GEORGE A. SLOUGH, a citizen of the United States, and a resident of Union City, in the county of Randolph and State of Indiana, have invented certain new and useful Improvements in Steering-Gear Locks, of which the following is a specification.

This invention relates to steering gear for automobiles and other devices, and relates more particularly to an improved means for locking such parts from movement.

An object of the present invention is to provide a relatively simply constructed and easily applied locking means for steering gear of motor vehicles which may be located in a position for easy access, and which will securely hold the parts from operation by unauthorized persons.

The above, and various other objects and advantages of this invention will be in part described, and in part understood, from the following detailed description of the present preferred embodiment, the same being illustrated in the accompanying drawing, wherein:

Figure 1 is a side elevation, partly in section, of a steering column having a steering gear lock constructed according to the present invention applied thereto.

Fig. 2 is an enlarged inner end view of the lock of this invention, taken substantially on the line 2—2 of Fig. 4, and showing parts of the same in section.

Fig. 3 is a similar view taken on the line 3—3 of Fig. 4, showing a transverse section through the parts of the lock.

Fig. 4 is a longitudinal section taken through the lock as applied to the steering gear, the latter being shown in section.

Referring to this drawing, A designates a steering column provided therein with a steering rod B upon the upper end of which is mounted in the usual manner a steering wheel C.

The hub of the steering wheel C is provided with a downwardly extending flange 10 adapted to surround and fit closely against the steering column A, and to support the lock of this invention. The lock comprises a cylinder or casing 11 having a base flange 12 adapted to be secured by rivets 13, or the like, to the flange 10 for rigidly and permanently mounting the lock thereon. The cylinder 11 is provided therein with a plug 14 having a keyway therein adapted to open to the outer end of the plug and the cylinder 11, and having pin chambers in which pin tumblers 15 are mounted. The cylinder 11 is provided with complementary pin chambers and pin drivers 16 which are urged against the tumblers 15 by springs 17 in the usual manner. A key 18 is adapted for insertion in the keyway in the plug 14 and is bitted at one edge for engagement with the pin tumblers 15 to raise the same to the required height for releasing the plug 14 for turning in the cylinder 11.

The plug 14, instead of being provided with the usual bolt throwing cam, is provided with an axially extending shank 19 provided with a spiral rib upon its outer surface adapted to engage in threaded relation with a correspondingly formed opening in the head 20 of a locking bolt 21. The locking bolt 21 extends axially from the plug 14 and projects through an aperture formed in the flange 10 to center the bolt 21 within the lock. The bolt 21 is held from turning against the cylinder 11 by the provision of a pair of outwardly extending lugs 22 arranged in diametrically opposite relation to each other, and adapted to seat in recesses 23 formed within the inner wall of the concavity of the cylinder 11.

The steering column is provided with one or more openings 24 therein adapted to register with the bolt 21 and to receive the same when projected inwardly for the purpose of locking the flange from turning about the steering column.

In operation, when the key 18 is inserted in the plug 14, and the tumblers 15 are raised to the desired height, the plug 14 may be turned from the position shown in Fig. 4. The turning of the plug 14 rotates the shank 19 and the spiral rib thereon advances the bolt 21 inwardly through the adjacent openings 24 in the steering column A. The bolt 21 thus holds the flange 10 and the steering wheel C with its post B from turning in the steering column. When the key 18 is withdrawn, the drivers 16 retain the plug 14 from turning in the cylinder 11, and consequently, the plug 14 can not be rotated to release the bolt 21 until the required key 18 is inserted in the way of the plug.

The construction is such that the bolt 21 is housed within the inner end of the cylinder 11, and access can not be had thereto for prying the bolt 21 into open position. By riveting the cylinder 11 upon the flange 10, the cylinder 11 can not be readily removed from the steering column without the consumption of considerable time and the necessary tools be applied thereto.

For releasing the steering mechanism, it is necessary to insert the required key 18, and rotate the plug 14, whereupon the spiral rib or the shank 19 withdraws the bolt 21 from the openings 24, and thus releases the flange 10 from the steering column A. The cylinder 11 may be located in any suitable position so that access may be readily had for inserting and removing the key 18. The device comprises but relatively few parts, occupies small space, and may be economically manufactured.

It is of course understood that various changes and modifications may be made in the details of construction of the above specifically described embodiment of the invention, without departing from the spirit thereof, the changes and modifications being restricted only by the scope of the following claim.

I claim:

In a lock for steering gear, the combination with an apertured steering column having an apertured steering post therein and a steering wheel on the column having a depending flange, of a cylindrical casing having its longitudinal axis radial to the steering column and provided with a base flange adapted to be permanently secured to the flange of the steering wheel, said casing provided with a axial bore and with an enlarged concavity in its inner end communicating with the bore, the outer end wall of said concavity provided with an elongated recess, a plug mounted to turn in said bore, key releasable means carried by the casing for locking said plug against movement, a locking bolt having an enlarged head and mounted for longitudinal movement in said concavity, lugs formed upon the head of said locking bolt and engaging in said recess to hold the bolt against rotation, a reduced threaded stud formed upon the inner end of said plug and engaging in said bolt whereby the bolt will be advanced, by rotation of the plug, into the openings in the steering post and column for interlocking the same.

GEORGE A. SLOUGH.

Copies of this patent may be obtained for five cents each, by addressing the "Commissioner of Patents, Washington, D. C."